United States Patent [19]

Lynch et al.

[11] Patent Number: 5,132,329
[45] Date of Patent: Jul. 21, 1992

[54] INTEGRAL SKIN POLYURETHANE FOAM

[75] Inventors: Thomas M. Lynch, Southgate; Richard P. Harrison, Lincoln Park, both of Mich.

[73] Assignee: BASF Corporation, Parsippany, N.J.

[21] Appl. No.: 585,446

[22] Filed: Sep. 20, 1990

Related U.S. Application Data

[63] Continuation-in-part of Ser. No. 504,813, Apr. 5, 1990, abandoned.

[51] Int. Cl.$^5$ .............................................. C08G 18/14
[52] U.S. Cl. ......................................... 521/51; 264/51
[58] Field of Search ............................. 521/51; 264/51

[56] References Cited

U.S. PATENT DOCUMENTS 4,605,681  8/1986  Grey et al. ............................ 521/51
4,780,482  10/1988  Kruger ................................ 521/51

*Primary Examiner*—Maurice J. Welsh
*Attorney, Agent, or Firm*—Martin P. Connaughton

[57] ABSTRACT

A process for preparing a flexible, low density, integral skin polyurethane foam wherein water is used as the sole blowing and density controlling agent. The process entails reacting an isocyanate component with a compound containing isocyanate reactive groups and further containing ether linkages, a polyurethane promoting catalyst, an alcohol, a surfactant, a chain extender and optional additives. The reaction is carried out at molded densities of from 15 pcf to 30 pcf in molds preheated to about 90° F. to about 130° F.

17 Claims, No Drawings

INTEGRAL SKIN POLYURETHANE FOAM

This is a continuation-in-part of copending U.S. application Ser. No. 07/504,813, filed Apr. 5, 1990 & now abandoned.

BACKGROUND OF THE INVENTION

The present invention pertains to a process for preparing integral skin polyurethane foam. In particular the invention relates to a process for preparing an integral skin foam wherein water is the main blowing and density controlling agent. The use of water as the blowing agent obviates the need to use chlorofluorocarbons which have been shown to be of detriment to the environment. Although the products of this process may exhibit a wide range of densities and hardness; it is those products referred to as low density, flexible, integral skin foams that are of particular interest.

DESCRIPTION OF THE RELATED ART

Integral skin foams are well known to those skilled in the art of polyurethane foams. Such foams have a cellular interior and a higher density microcellular or noncellular skin. In general, to prepare such foams one reacts an organic isocyanate with a substance having at least one isocyanate reactive group, in the presence of a catalyst, blowing agent, and a variety of optional additives. The reaction is carried out in a mold where a higher density skin forms at the interface of the reaction mixture and the inner surface of the mold.

At the present time, the most common type of blowing agent used in integral skin polyurethane foams is chlorofluorocarbons (CFC) or combinations of CFC's and other blowing agents. Industry today, however, is faced with a mandate to reduce and eventually eliminate the use of CFC's. To this end much energy is being devoted.

Past methods of preparing integral skin polyurethanes with CFC's as a blowing agent include the following. G.B. Pat. No. 1,209,297 teaches the use of a combination blowing agent consisting of a CFC and hydrate of an organic compound which splits off water at temperatures above 40° C. This blowing agent or combination of agents was used in a formulation with a suitable polyisocyanate a polyol containing hydroxyl groups and a catalyst. This patent discloses the undesirability of having free water in the system. The patent states that the presence of even small quantities of water produce a skin which is permeated with fine cells.

U.S. Pat. No. 4,305,991 describes a process for preparing integral skin polyurethane foams wherein a polyisocyanate, containing aliphatically and/or cycloaliphatically bound isocyanate groups, is reacted with polyhydroxyl compounds containing ether linkages, a chain extender, a catalyst, additives and a blowing agent. The blowing agent is characterized as a readily volatile organic substance. Examples of which include both halogenated and nonhalogenated volatile organic compounds, to which water may be added as a chemical blowing agent.

More recently attempts have been made to evaluate the performance of alternate blowing agents to CFC's. In a paper by J. L. R. Clatty and S. J. Harasin, entitled, *Performance of Alternate Blowing Agents to Chlorofluorocarbons in RIM Structural and Elastomeric Polyurethane Foams*, presented to the 32nd Annual Polyurethane Technical/Marketing Conference, October, 1989, the authors addressed the use of water as a blowing agent for integral skin polyurethane reaction injection molded systems (RIM). In this application the water concentration in the system is controlled by the concentration and type of molecular sieves used. As in the Great Britain patent discussed previously the water is not in a free form but bound in some manner. In this instance, the authors state that this process is limited to use in rigid foam systems and the flexible integral skin formulations may best be served by using HCFC's or HCFC-22 as substitutes for CFC's.

Summary of the Invention

Prior processes have used water in combination with other blowing and density controlling agents as a means of preparing integral skin polyurethane foams.

It is the object of the present invention to provide a flexible, low density integral skin polyurethane foam and a process wherein the integral skin polyurethane foam uses no CFC's or volatile alkane blowing agent. The process for said invention comprises reacting:

A) a polyisocyanate component;
B) compounds bearing hydrogen atoms reactive with isocyanate groups and having an average functionality of at least 1.5 and further containing ether linkages;
C) water;
D) an effective amount of a polyurethane promoting catalyst;
E) an alcohol having from 10 to about 20 carbons;
F) a surfactant; and
G) a chain extender.
optional additives may be added.

DETAILED DESCRIPTION OF THE INVENTION

The instant invention relates to a process for the production of integral skin polyurethane foams and more particularly those integral skin foams which are flexible and have a molded density of from about 15 pcf to about 30 pcf. In general, potential applications for this material include but are not limited to automotive parts such as steering wheels, armrests, horn covers, headrests, or trim and non-automotive applications not limited to, shoe soles, gaskets, or furniture parts.

The process comprises reacting a polyisocyanate component in which all of the isocyanate groups are aromatically bound; with a polyether having a molecular weight from about 2500 to about 6000; water used as the exclusive blowing agent; a catalyst of a type known by those skilled in the art, in sufficient quantity to catalyze the reaction; an alcohol having from about 10 to 20 carbons; a surfactant such as those silicone containing compounds known as "Superwetting Agents" made by the Dow Corning Corporation, and a chain extender such as ethylene glycol or diethylene glycol.

The organic polyisocyanates used in the instant process contain aromatically bound isocyanate groups. Representatives of the types of organic polyisocyanates contemplated herein include, for example, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2-6 toluene diisocyanate, hexahydrotoluene diisocyanate, 1,5-naphthylene diisocyanate, 1-methoxy-2,4-phenylene diisocyanate, hexahydrotoluene diisocyanate, 1,5-naphthylene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-4,4'-diphenylmethane diisocyanate and 3,3'-dimethyldiphenylmethane-4,4'-diisocyante; the triisocyanates such as 4,4',4''-triphenylmethane triisocyanate, polymethylene polyphenylene polyisocyanate and 2,4,6-toluene triisocyanate; and the tetraisocyanates such as 4,4-dimethyl-2,2'-5,5'-diphenylmethane tetraisocyanate. Especially useful due to their availability and properties are 2,4'-diphenylmethane diisocyanate, 4,4-diphenylmethane diisocyanate, polymethylene polyphenylene polyisocyanate, and mixtures thereof.

These polyisocyanates are prepared by conventional methods known in the art such as the phosgenation of the corresponding organic amine. Included within the useable isocyanates are the modifications of the above isocyanates which contain carbodiimide, allophonate, urethane or isocyanurate structures. Generally, these modified isocyanates will have an isocyanate content of from about 20 percent to about 40 percent by weight.

Mixtures of polymeric diphenylmethane diisocyanate (poly MDI) and carbodiimide or urethane modified MDI are preferred. The above mentioned polymeric diphenylmethane diisocyante compounds are marketed by BASF under the trademark designation LUPRANATE TM M-20. M-20 has an average functionality of about 2.7 and an isocyanate content of about 31% by weight, and is represented by the general formula:

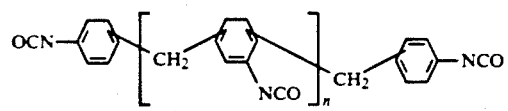

where n is greater than 1.

Carbodiimide modified diphenylmethane diisocyanates are well known to those skilled in the art, and are prepared by catalytic dimerization of MDI. Such a carbodiimide modified diisocyanate is marketed by BASF under the trademark designation LUPRANATE TM MM-103. MM-103 has an isocyanate content of about 29% by weight, and is represented by the formula:

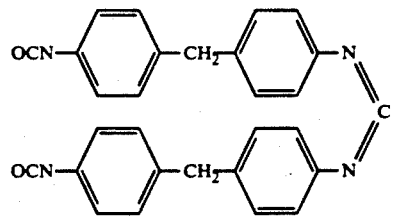

Suitable urethane modified diisocyantes are represented by the general formula:

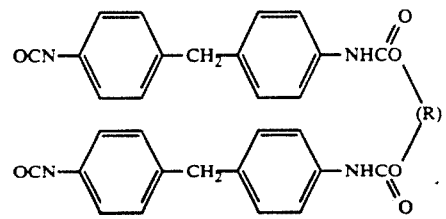

compound having a functionality greater than one; preferably having a functionality of two. Examples of these compounds include; ethylene glycol, propylene glycol, diethylene glycol, dipropylene glycol, glycol initiated polyoxyalkylene polymers and copolymers, and mixtures thereof. An example of such a urethane modified diisocyanate is marketed by BASF under the trademark designation LUPRANATE TM MP-102. MP-102 is a pure MDI prepolymer with an isocyanate content of about 23% by weight. These compounds and their methods of preparation are well known in the art.

Any suitable polyoxyalkylene polyether polyol may be used such as those resulting from the polymerization of a polyhydric alcohol and an alkylene oxide. Representatives of such alcohols may include, ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, or 1,2,6-hexanetriol. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols may be prepared by any known process such as, for example, the process disclosed by Wurtz in 1859 and Encyclopedia of Chemical Technology, Vol. 7, pp 257-262, published by Interscience Publishers, Inc. (1951) or in U.S. Pat. No. 1,922,459.

Other polyoxyalkylene polyether polyols which may be employed are those which contain grafted therein vinylic monomers.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092, 4,014,846, 4,093,573, and 4,122,056, the disclosures of which are herein incorporated by reference, or (3) by low temperature polymerization in the presence in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. Nos. 3,652,659 and Re. 29,014 may be employed in preparing the graft polymer dispersions used in the instant invention, the disclosures of which are incorporated by reference. Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557, the disclosures of which are incorporated by reference.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation an a hydroxyl, carboxyl, anhydride, or epoxy group as a reactant in the preparation of the conventional polyol. Representative of such organic compounds include unsaturated mono and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, a-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl a-chloroacrylate, ethyl a-ethoxyacrylate, methyl a-acetam; inoacrylate, butyl acrylate, 2-ethylhexyl acrylate, phenyl acrylate, phenyl methacrylate, a-chloroacrylonitrile, methacrylonitrile, N,N-dimethylacrylamide, N,N-dibenzylacrylamide, N-butylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(b-chloroethyl) vinyl phosphonate, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for us in this invention. Preferably, the monomer is selected from the group consisting of acrylonitrile, styrene, methyl methacrylate and mixtures thereof.

Illustrative initiators which may be employed for the polymerization of vinyl monomers are the well-known free radical types of inyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumeme hydroperoxide, paramenthane hydroperoxide, di-a-cumyl peroxide, dipropyl peroxide, diisopropyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, amethylbenzyl hydroperoxide, a-methyl-a-ethyl benzyl hydroperoxide, tetralin hydroperoxide, triphenylmethyl hydroperoxide, diphenylmethyl hydroperoxide, a-a'-azo-bis(2-methyl) butyronitrile, a,a'-azo-bis(2-methyl) heptonitrile, 1,1-azo-bis (1-cyclohexane) carbonitrile, dimethyl a,a'-azobis(isobutyronitrile), 4,4'-azo-bis(4-cyanopetanoic) acid, azo-bis(isobutyronitrile), 1-t-amylazo-1-cyanocyclohexane, 2-t-butylazo-2-cyano-4-methoxy-4-methylpentane, 2-t-butylazo-2- cyano-4-methylpentane, 2-(t-butylazo)isobutyronitrile, 2-t-butylazo-2-cyanobutane, 1-cyano-1-(t-butylazo)cyclohexane, t-butyl peroxy-2-ethylhexanoate, t-butylperpivalate, 2,5-dimethyl-hexane-2,5-diper-2-ethyl hexoate, t-butylperneo-decanoate, t-butylperbenzoate, t-butyl percrotonate, persuccinic acid, diisopropyl peroxydicarbonate, and the like; a mixture of initiators may also be used. Photochemically sensitive radical generators may also be employed. Generally from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840 which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol.

The preferred polyols are polyethers having an average functionality of about 1.75 to about 3.0 and a molecular weight range of from about 4000 to about 5000. The most preferred polyols are polyethers which are copolymers of ethylene oxide and propylene oxide having a diol or triol initiator such as propylene glycol or glycerine.

Any suitable catalyst may be used including tertiary amines such as, triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Examples of such commercially available catalysts is the DABCO ® series available through Air Products, Corp. Other suitable catalysts are, for example, dibutyltin dilaurate, dibutyltindiacetate, stannous chloride, dibutyltin di-2-ethyl hexanoate, stannous oxide, available under the FOMREZ ® trademark, as well as other organometallic compounds such as are disclosed in U.S. Pat. No. 2,846,408.

An alcohol having from about 10 to about 20 carbons or mixtures thereof, is used according to the present invention. Alcohols of this type are known to those skilled in the art. The types of alcohols contemplated are commonly produced via the oxo process and are referred to as oxo-alcohols. Examples of some commercially available products include LIAL 125 from Chimica Augusta SpA or NEODOL ® 25 produced by Shell.

A surface active agent is necessary for production of integral skin polyurethane foam according to the present invention. Surfactants which may be used are those which aid in homogenizing the initial materials and may also be suitable for regulating cell structure. Typical examples are foam stabilizers such as siloxane oxyalkylene heterol polymers and other organic polysiloxanes, oxyethylated alkyl phenol, oxyethylated fatty alcohols, paraffin oils, castor oil ester, phthalic acid esters, ricindolic acid ester, and Turkey red oil, as well as cell regulators such as paraffins.

Chain extending agents employed in the preparation of integral skin polyurethane foams include those having two functional groups bearing active hydrogen atoms. A preferred group of chain extending agents includes ethylene glycol, diethylene glycol, propylene glycol or 1,4-butanediol.

Additives which may be used in the process of the present invention include known pigments, such as carbon black, dyes and flame retarding agents (e.g., tris-chloroethyl phosphates or ammonium phosphate and polyphosphate), stabilizers against ageing and weathering, plasticizers, such as gamma butyrolactone; fungistatic and bacteriostatic substances, and fillers.

The main blowing and density controlling agent used according to the present invention is water. For the purpose of the invention water is present in amounts up to and including 1.0 pbw based on the total weight of the nonisocyanate components. It is preferably present in amounts from about 0.4 pbw to 1.0 pbw based on the total of the nonisocyanate components.

The mechanical parameters of the instant process are flexible and depend on the final application of the integral skin polyurethane foam. The reaction system is versatile enough that it may be made in a variety of densities and hardness'. However, the reactivity profile of the system is important. The system should have a gel time from about 5 seconds to about 20 seconds faster than the total rise time. The system may be introduced into a mold in a variety of ways known to those skilled in the art. It may be shot into a preheated closed mold via high pressure injection technique. In this manner it processes well enough to fill complex molds at low mold densities (from 18 pcf to 25 pcf). It may also be run using a conventional open mold technique wherein the reaction mixture or system is poured or injected at low pressure or atmospheric pressure into a preheated open mold. In the instant process the system may be run at mold temperatures from about 85° F. to about 120° F. with from about 90° F. to about 110° F. being preferred.

Having thus described the invention, the following examples are given by way of illustration.

TEST METHODS

Density ASTM D-1622
Tensile Elongation ASTM D412 Die A
Split Tear ASTM D-1938
Graves Tear ASTM D-412 Die C
Shore Hardness ASTM D-2240
Compression Set ASTM D-3574.

EXAMPLE 1

86.33 parts by weight (pbw) of a polyether component comprising, 78.33 pbw of a glycerine initiated polyoxypropylene-polyoxyethylene copolymer having a hydroxyl number of 35 and 8.0 pbw of an acrylonitrile-styrene graft, trimethylolpropane initiated polyoxypropylene-polyoxyethylene copolymer having a hydroxyl of 24, was combined with 6.00 pbw ethylene glycol, 0.75 pbw water, 0.70 pbw of a $C_{12}-C_{15}$ oxoalcohol, 0.60 pbw of a dialkyl phthalate surfactant, 5.00 pbw of gamma butyrolactone, and 0.62 pbw of a catalyst mixture consisting of 0.51 pbw of an amine catalyst in dipropylene glycol, 0.02 pbw of a dibutyltin dilaurate catalyst and 0.09 pbw of an acid blocked amine catalyst in dipropylene glycol.

This polyol resin component was combined with an isocyanate blend in a ratio of 100/57.8, polyol/isocyanate. The isocyanate is a 73/22/5 blend of a urethane modified pure diphenylmethane diisocyanate prepolymer, polymethylene polyphenylisocyante and a carbodiimide modified 4,4'-diphenylmethane diisocyanate, such as LUPRANATE™ M-20, LUPRANATE™ MP-102 and LUPRANATE™ MM-103.

The room temperature polyol/isocyanate mixture was poured into an open mold preheated to 90°–110° F. The mold was subsequently closed. Two molded parts were made having excellent skin formation and the following mechanical properties:

|  | 1 | 2 |
|---|---|---|
| Density (pcf) | | |
| core | 26.35 | 25.61 |
| section | 27.78 | 27.51 |
| Split Tear (pi) | | |
| skin | 23.9 | 23.3 |
| skin and core | 20.2 | 21.7 |
| core | 10.9 | 13.0 |
| Graves Tear (pi) | | |
| skin | 73.0 | 73.8 |
| skin and core | 52.4 | 52.6 |
| core | 29.4 | 31.2 |
| Compression Set (% set) | | |
| 50% @ 158° F. | 13.30 | 13.41 |
| 75% @ 158° F. | 11.11 | 12.12 |

EXAMPLE 2

91.0 pbw of a glycerine initiated polyoxypropylene-polyoxyethylene copolymer which had a hydroxyl number of 27.5 was combined with 6.0 pbw ethylene glycol, 0.7 pbw water, 0.6 pbw of a $C_{12}$–$C_{15}$ oxoalcohol, 0.5 pbw of a surfactant comprised of methyl(polyethyleneoxide)-bis(trimethylsiloxy) silane and polyethylene oxide monoallyl ether, and 1.2 pbw of an amine catalyst. 1.0 pbw based on the total weight of the polyol resin of carbon black was added.

The polyol resin component was combined with an isocyanate blend in a ratio of 100/55.1, polyol/isocyanate. The isocyanate is a 50/50 blend of a carbodiimide modified 4,4'-diphenylmethane diisocyanate and a urethane modified diphenylmethane diisocyanate prepolymer, such as LUPRANATE™ MM-103 and LUPRANATE™ MP-102.

The room temperature polyol/isocyanate mixture was poured into an open mold preheated to 95°–100° F. The mold was subsequently closed. Two molded parts were made having a clearly defined skin. The surfaces of the molded parts were wiped with methylene chloride and isopropyl alcohol. There was no detectable effect. The molded parts exhibited the following mechanical properties.

|  | 1 | 2 |
|---|---|---|
| Density (pcf) | | |
| section | 21.2 | 23.7 |
| Split Tear (pi) | | |
| skin | 53.6 | 56.5 |
| skin and core | 27.6 | 26.6 |
| core | 11.0 | 11.6 |
| Graves Tear (pi) | | |
| skin | 53.6 | 56.5 |
| skin and core | 52.7 | 58.5 |
| core | 27.1 | 30.4 |
| Shore "A" hardness (5 sec) | 56 | 60 |
| Tensile Strength (psi) | | |
| skin | 313.4 | 346.3 |
| skin and core | 305.1 | 357.1 |
| core | 190.1 | 202 |
| Elongation, % break | | |
| skin | 186.7 | 178.0 |
| skin and core | 176.7 | 173.3 |
| core | 158.3 | 128.0 |
| Compression Set (% set) | | |
| 50% @ 72° F. | 19.65 | 17.89 |
| 25% @ 72° F. | 10.74 | 13.33 |

EXAMPLE 3

92.815 pbw of a polyether component comprising; 77.815 pbw of a glycerine initiated polyoxypropylene polyoxyethylene copolymer having a hydroxyl number of 27.5 and 15.0 pbw of an acrylonitrile-styrene graft, trimethylolpropane initiated polyoxypropylene-polyoxyethylene copolymer having a hydroxyl number of 24, was combined with 4.7 pbw ethylene glycol, 0.7 pbw of a $C_{12}$–$C_{15}$ oxoalcohol, 0.50 pbw of a surfactant comprised of methyl (polyethylene oxide)-bis(trimethylsiloxy) silane and polyethylene oxide monoallyl ether, 0.50 pbw of a mixture of amine catalysts and 0.035 pbw of a dibutyltin dilaurate cataylst.

This polyol resin component was combined with an isocyanate blend in a ratio of 100/46.1, polyol/isocyanate. The isocyanate is a 50/50 blend of a carbodiimide modified 4,4'-diphenylmethane diisocyanate and a urethane modified diphenylmethane diisocyanate prepolymer, such as LUPRANATE™ MM-103 and LUPRANATE™ MP-102. The room temperature polyol/isocyanate mixture was poured into an open mold, preheated to 95°–100° C. and the mold subsequently closed. Two molded parts were made having a clearly defined skin and the following mechanical properties:

|  | 1 | 2 |
|---|---|---|
| Density (pcf) | | |
| section | 23.70 | 27.72 |
| core | 20.34 | 23.88 |
| Tensile Strength (psi) | | |
| skin | 420.33 | 496.33 |
| skin and core | 250.00 | 389.33 |
| core | 158.67 | 229.33 |
| Elongation, % Break | | |
| skin | 233.33 | 218.33 |
| skin and core | 208.33 | 206.67 |
| core | 210.0 | 208.33 |
| Split Tear (pi) | | |
| skin | 13.95 | 21.30 |
| skin and core | 14.85 | 22.30 |
| core | 11.20 | 13.70 |
| Graves Tear (pi) | | |
| skin | 68.75 | 80.35 |
| skin and core | 45.35 | 59.65 |
| core | 27.25 | 36.55 |
| Compression Set (% set) | | |
| 25% @ 158° F. | 100.48 | 88.14 |
| 50% @ 158° F. | 64.49 | 64.25 |

EXAMPLE 4

Same as example 3 with the exception of the isocyanate component. A 70/30 blend of a urethane modified diphenylmethane diisocyanate prepolymer and a polymethylene polyphenylisocyante composition, such as LUPRANATE™ MP-102 and LUPRANATE™ M-20 is substituted for the isocyanate in Example 3. The ratio used is 100/47.3, polyol/isocyanate. A molded part was made having excellent skin formation and the following mechanical properties.

| | 1 |
|---|---|
| Density (pcf) | |
| section | 27.01 |
| core | 23.92 |
| Tensile Strength (psi) | |
| skin | 360.33 |
| skin and core | 310.33 |
| core | 194.00 |
| Elongation, % Break | |
| skin | 143.33 |
| skin and core | 128.33 |
| core | 136.67 |
| Split Tear (pi) | |
| skin | 13.75 |
| skin and core | 17.40 |
| core | 11.80 |
| Graves Tear (pi) | |
| skin | 53.95 |
| skin and core | 43.75 |
| core | 24.80 |
| Compression Set (% set) | |
| 50% @ 158° F. | 12.88 |
| 25% @ 158° F. | 32.03 |

COMPARATIVE EXAMPLE 1

Same as Example 3 with the exception; no surfactant or oxoalchol is added to the polyol resin component.

RESULTS

Several molded parts were made having densities ranging from 17 pcf to 25 pcf. A skin was formed but there were numerous air bubbles present. The skin was also porous.

COMPARATIVE EXAMPLE 2

Freon Blown Integral Skin 83 pbw of a polyol comprising of a trimethylopropane initiated polyether polyol having a hydroxyl number of 35, trimethylopropane initiated polyether having a hydroxyl number of 25, and an acrylonitrile-styrene graft, of a trimethylolpropane initiated polyether having a hydroxyl of 24 is mixed with 1.4 pbw of a tertiary amine catalyst mixture, 6 pbw of a diol-triol mixture, 0.1 pbw of a silicone containing surfactant and 9.5 pbw Freon F-11A.

This polyol resin was combined with an isocyanate blend in a ratio of 100/46.8, polyol/isocyanate. The isocyanate is a 75/15/5/5 blend of diphenylmethane diisocyanate, polymethylene polyphenylisocyanate, an urethane modified diphenylmethane diisocyanate prepolymer and Freon F-113A an example of such a blend of isocyanates is LUPRANATE ™ M, LUPRANATE ™ M-20, and LUPRANATE ™ MP-102.

The product was injected into a preheated mold. The molded part exhibits the following mechanical properties.

| | 1 |
|---|---|
| Density (pcf) | |
| section | 29.3 |
| core | 24.9 |
| Shore A Hardness (5 sec.) | 69.3 |
| Tensile (psi) | |
| skin | 856.7 |
| skin and core | 510.0 |
| core | 219.0 |
| Split Tear (pi) | |
| skin | 27.0 |
| skin and core | 19.3 |
| core | 8.3 |
| Graves Tear (pi) | |
| skin | 99.3 |
| skin and core | 52.7 |
| core | 22.5 |
| Compression Set (% set) | |
| 50% @ 72° F. | 19.0 |

We claim:

1. A process for preparing a flexible, low density, integral skin foam, free of chlorofluorocarbon blowing agents, comprising reacting:
   A) an isocyanate component in which all of the isocyanate groups are aromatically bound; with
   B) compounds bearing hydrogen atoms reactive with isocyanate groups and having ether linkages, molecular weights from about 2500 to about 6000 and an average functionality of at least 1.5;
   C) water as a blowing agent present in an amount up to 1.0 pbw based on the total weight of all nonisocyanate components;
   D) an effective amount of a polyurethane promoting catalyst;
   E) a monofunctional alcohol having from about 10 to about 20 carbons;
   F) a surfactant; and
   G) a chain extender;
   wherein molded densities are from about 15 pcf to about 30 pcf and gel time is from about 5 seconds to about 20 seconds faster than the total rise time.

2. A process as claimed in claim 1, wherein the isocyanate component is a polymethylene polyphenylisocyanate, a urethane modified diphenylmethane diisocyanate prepolymer, a carbodiimide modified 4,4'-diphenylmethane diisocyanate, or a mixture thereof.

3. A process as claimed in claim 1, wherein the isocyanate component and the mixture of nonisocyanate components are present in a ratio of from about 44/100 to about 57/100 pbw isocyanate/nonisocyanate.

4. A process as claimed in claim 1, wherein the compound bearing active hydrogens (B) is a polyether copolymer having a molecular weight of from 4000 to 5000 and an average functionality of about 1.75 to about 3.0, an acrylonitrile-styrene graft polyether copolymer, or mixtures thereof and is present in amounts from 85.0 pbw to about 93.0 pbw based on the total weight of nonisocyanate components.

5. A process as claimed in claim 1, wherein water (C) is present in amounts from about 0.4 pbw to about 0.8 pbw based on the total weight of nonisocyanate components.

6. A process as claimed in claim 1, wherein the polyurethane promoting catalyst (D) is a tertiary amine, organotin compound, or mixtures thereof present in amounts of from about 0.5 pbw to about 1.6 pbw based on the total weight of nonisocyanate components.

7. A process as claimed in claim 1, wherein the monofunctional alcohol (E) is a mixture of monofunctional alcohols having from 12 to 15 carbons and is present in amounts from about 0.4 pbw to about 1.0 pbw based on the total weight of nonisocyanate components.

8. A process as claimed in claim 1, wherein the surfactant (F) is a silicone containing polyether, an ester, or mixtures thereof, present in amounts of from about 0.3 pbw to 0.6 pbw based on the total weight of all nonisocyanate components.

9. A process as claimed in claim 1, wherein the chain extender (G) is ethylene glycol, diethylene glycol or mixtures thereof present in amounts of from 5.0 pbw to about 6.5 pbw based on the total weight of nonisocyanate components.

10. A process as claimed in claim 1, further comprising an additive present in amounts up to about 5 pbw of the total weight of all nonisocyanate components.

11. A process as claimed in claim 1, wherein the molded density is from 18 pcf to about 25 pcf.

12. A process according to claim 1, wherein the reaction is carried out in a mold preheated to 90° to 130° F.

13. A process as claimed in claim 1, further comprising an additive present in amounts up to about 5 pbw of the total weight of all isocyanate components.

14. A process as claimed in claims 10 or 13, wherein the additive is gamma butyrolactone.

15. A process as claimed in claim 1, wherein the isocyanate component and nonisocyanate components are injected into a closed mold using a high pressure injection technique.

16. A process as claimed in claim 1, wherein the isocyanate component and nonisocyanate components are poured into a preheated open mold.

17. A flexible, low density, integral skin polyurethane foam containing no chlorofluorocarbons or volatile organic alkanes as blowing agents, consisting essentially of the reaction product of:
A) an isocyanate component in which all of the isocyanate groups are aromatically bound;
B) a polyether copolymer or mixture of polyether copolymers bearing hydrogen atoms reactive with isocyanate groups and having molecular weights from 2500 to about 6000 and an average functionality of at least 1.5;
C) water as the exclusive blowing agent present in amounts up to 1.0 pbw based on the total weight of nonioscyanate components;
D) an effective amount of a polyurethane promoting catalyst;
E) a monofunctional alcohol having from about 10 to about 20 carbons;
F) a surfactant;
G) a chain extender selected from the group consisting of ethylene glycol, diethylene glycol, and mixtures thereof;

wherein the flexible integral skin foam has a molded density of about 15 pcf to about 30 pcf.

* * * * *